Jan. 29, 1929.
A. G. RONNING ET AL
1,700,421
COMBINATION TRACTOR IMPLEMENT
Filed April 29, 1920
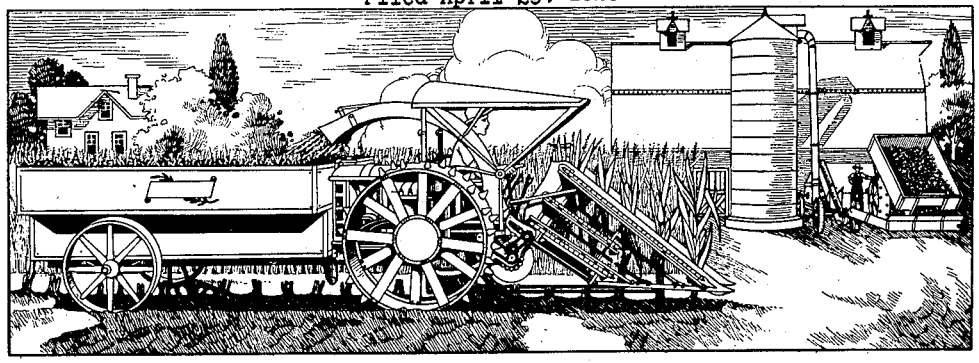
Fig. 4
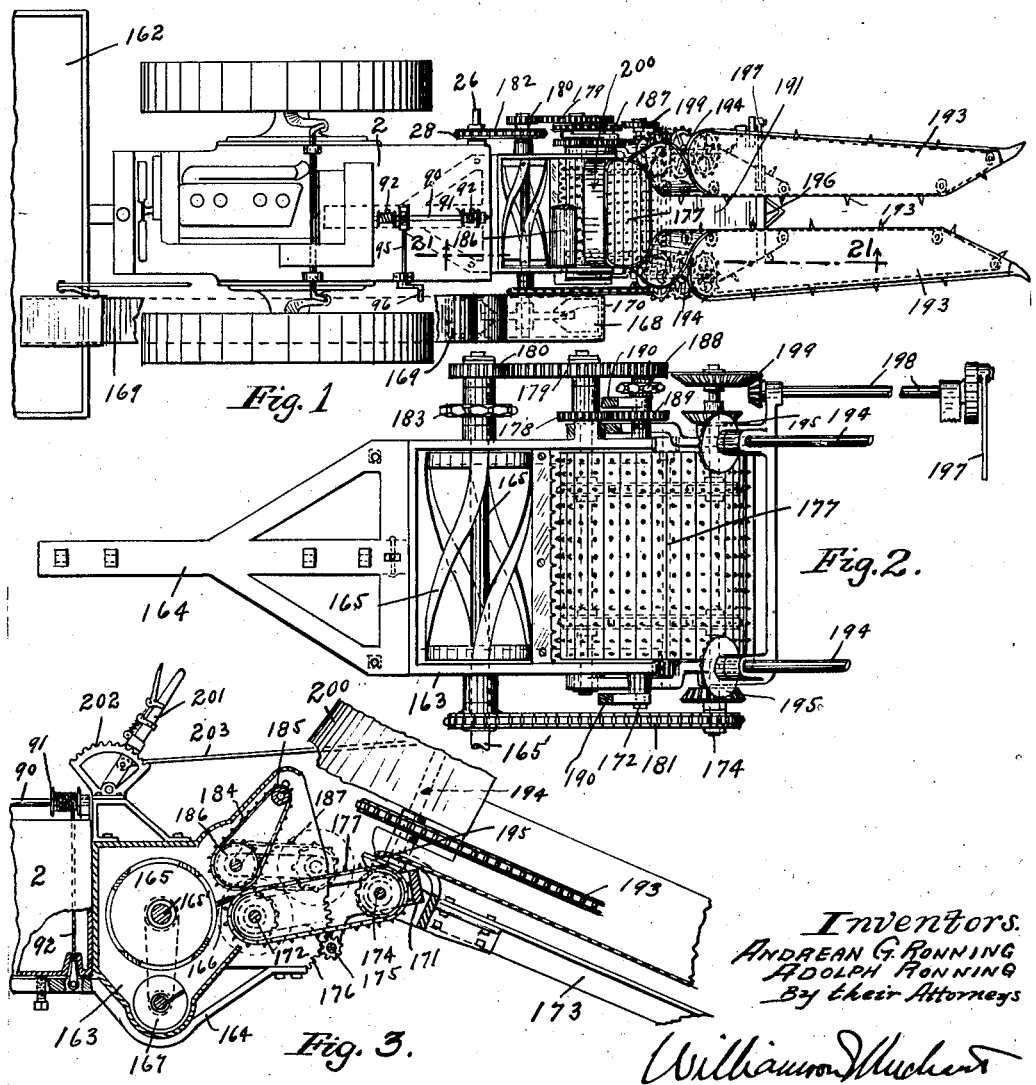
Inventors.
Andrean G. Ronning
Adolph Ronning
By their Attorneys Patented Jan. 29, 1929.

1,700,421

UNITED STATES PATENT OFFICE.

ANDREAN G. RONNING AND ADOLPH RONNING, OF MINNEAPOLIS, MINNESOTA; JACOB A. RONNING AND ADOLF RONNING EXECUTORS OF SAID ANDREAN G. RONNING, DECEASED.

COMBINATION-TRACTOR IMPLEMENT.

Application filed April 29, 1920. Serial No. 377,564.

This invention relates to a method and apparatus for harvesting ensilage. It is an object of this invention to provide an improved method whereby the plants to form the ensilage will be harvested in the field by a combined traveling harvester, reducer and conveyor. The ensilage will then be transported to the vicinity of the silo or storage bin and conveyed into said bin.

It is a further object of the invention to provide a novel arrangement of apparatus and also a novel structure of apparatus for carrying out the above defined method.

These and other objects of the invention will be fully set forth in the following description made in connection with the accompanying drawings in which like reference characters refer to the same parts throughout the different views, and in which, Fig. 1 is a plan view with some parts broken away, illustrating an ensilage harvester, the same being attached to a tractor trucks;

Figs. 2 is a plan view with some parts sectioned and some parts broken away showing on an enlarged scale, the ensilage cutting mechanism of the harvester shown in Fig. 1.

Fig. 3 is a vertical section taken approximately on the line 3—3 of Fig. 1, some parts being in full;

Fig. 4 is a perspective view showing in the main view, the ensilage harvester and tractor truck shown in Fig. 1, and showing in a small view at the right, the same rig used to blow the ensilage into a silo;

Referring to the drawing more particularly and by reference characters, 2 designates a tractor unit having laterally spaced and steerable traction wheels. The tractor is coupled to a two-wheeled truck 162, the box of which is adapted to receive the ensilage from the ensilage harvester, which latter is pushed directly ahead of the tractor. The body of the truck 162 is rigidly but detachably connected to the frame of the tractor, so that the tractor is balanced thereby and the complete rig can be steered by oscillatory movement of the tractor wheels. The box of the truck may be arranged to dump its load in any well known manner.

The numeral 163 indicates a hood-like frame which contains the ensilage cutter and is, itself, rigidly secured to a frame 164 that is rigidly coupled to the front end portion of the tractor frame 2, and, as shown, is subject to a hoisting device comprising the cable 92, drum 91 and shaft 90.

Rotatably mounted within the hood 163 is an ensilage cutter 165, of the rotary cutting wheel type, that co-operates with a fixed shearing blade 166. Below the ensilage cutter 165 is a feed screw 167 that delivers to a fan casing 168 that is provided with an upwardly and rearwardly extended discharge spout 169 arranged to deliver into the box of the truck 162. Working within the fan casing 163 and carried by the shaft of the ensilage cutter 165 is a fan head 170.

The numeral 171 indicates a U-shaped supplemental frame pivotally connected to the sides of the hood 163 by a shaft 172. The numeral 173 indicates an inclined frame which may be treated as the ensilage harvester frame proper, and which, at its upper rear end is pivotally connected to the supplemental frame 171 around a shaft 174. The supplemental frame 171 carries a shaft 175 equipped with pinions that mesh with toothed segments 176 formed on the sides of the hood 163. By rotation of the shaft 175, the front end of the supplemental frame 171 and the rear end of the frame 173 may be raised and lowered.

The shafts 172 and 174 are equipped with sprockets, over which runs an endless toothed feed belt 177 that delivers the stalks to the ensilage cutter. Shaft 172 is provided at one end with spur gears 178 and 179. Gear 179 meshes with a spur gear 180 on one end of ensilage cutter shaft 165'. At the opposite side of the hood 163 is a sprocket chain 181 that runs over sprockets on the shafts 165' and 174, so that the feed belt 177 will be driven from the shaft of the ensilage cutter. Shaft 165' is driven through a sprocket chain 182 that runs over a sprocket 183 on said shaft and over the sprocket 28 on the engine shaft 26. By interchanging gears 179 and 180 for others of different size, the length of the cut ensilage may be varied.

The numeral 184 indicates an overhead feed belt mounted to run over a floating guide roller 185 and under a floating feed roller 186 that is driven by a sprocket chain 187 driven from a sprocket 188 journaled on one side of the hood and driven from the shaft 172 through gears 189. The floating roller 186 is journaled on the free end of arms 190 pivoted to the sides of the hood.

The numeral 191 indicates a deck secured to the lower end of the frame 173. The numeral 192 indicates the gathering frames which are rigidly secured to and project forward from the frame 173 and deck 191 and are provided with toothed gathering chains 193 driven from sprocket-equipped shafts 194 which, in turn, are driven from the shaft 174 through beveled gears 195.

The primary stalk cutter 196 is mounted to vibrate at the front edge of the deck 191 and is connected by a pitman 197 to a crank on the end of a shaft 198 that is driven from the shaft 174 through beveled gears 199. The numeral 200 indicates a deflecting hood which turns the stalk, head ends slightly forward, and causes the stalks to be delivered to the belt 177, and thence to the ensilage cutter, butt ends first.

In this arrangement, the gathering mechanism, the feed mechanism, and the ensilage cutter are located in a line, one ahead of the other, and in front of the tractor, and the cut ensilage is delivered directly rearward to the receiving truck. In this arrangement, it may be noted that the tractor is turned, fan and radiator end rearward, and is driven forward with what may be treated as its rear end foremost. This tractor, however, is adapted to run in either direction.

For raising and lowering the front end of the frame 173 and parts carried thereby, around the axis of shaft 174 as a pivot, I provide a latch lever 201 pivoted to a latch 102 rigid on the hood 163 and connected by a lifting rod 203 to the hood 200.

The stalks are harvested in the field by the traveling cutter and reducer above described and the preliminary reduced stalks are delivered to the truck receptacle 162. The cut silage, is then transported to the vicinity of the silo where the same reducing and conveying apparatus is used to again reduce the stalks and convey the same into the silo. This method is a very efficient one for handling the ensilage. The labor of first cutting the stalks of corn, shocking the same, tieing up the shocks and hauling the shocks into the vicinity of the silo is eliminated, as is also the expense of the material necessary to tie the shocks.

While one embodiment of applicant's apparatus and method has been described, it will, of course, be understood that various changes and modifications in the form, details and arrangement of the same may be made without departing from the scope of applicant's invention, which, generally stated, consists in the matter shown and described and set forth in the appended claims.

What we claim is:

1. The combination, in a machine of the character described, of a tractor member having a power unit and traction wheels, an implement adapted to be carried by the member for operation in advance thereof, a wheeled container arranged rearwardly of the tractor member so as to form a vehicle in conjunction therewith, and means for detachably connecting the tractor member with the wheeled container, and whereby the latter will assist in balancing the tractor with said implement in operative position above the ground.

2. The combination, in a machine of the character described, of a tractor member having a power unit and traction wheels, an implement adapted to be carried by the member for operation in advance thereof, means for detachably connecting the implement to the member, a wheeled container detachably secured to and in rigid alignment with the member at the rear thereof, so as to substantially form a separable vehicle therewith, and a conveyor carried by the implement and extending with its delivery and to a delivering position with reference to the container, when the latter is connected with the tractor member.

3. The combination including a tractor member and a wheel supported container and means for securing the same together in rigid alignment to form a separable vehicle, and means for detachably connecting an implement to the vehicle in advance thereof.

4. The combination including a tractor member and a wheel supported container and means for securing the same together in rigid alignment to form a separable vehicle, a harvester arranged in advance of the tractor unit and detachably carried thereby, and a conveyor carried by the harvester and arranged to deliver a harvested crop therefrom to the container.

In testimony whereof we affix our signatures.

ANDREAN G. RONNING.
ADOLPH RONNING.